United States Patent
DeLangis

(10) Patent No.: US 6,913,203 B2
(45) Date of Patent: Jul. 5, 2005

(54) SELF POWERED ELECTRONICALLY CONTROLLED MIXING VALVE

(76) Inventor: Eric DeLangis, 4339 Golf Vista Dr., Loveland, CO (US) 80537

(*) Notice: Subject to any disclaimer, the term of this patent is extended or adjusted under 35 U.S.C. 154(b) by 0 days.

(21) Appl. No.: 10/728,293

(22) Filed: Dec. 3, 2003

(65) Prior Publication Data

US 2005/0121529 A1    Jun. 9, 2005

(51) Int. Cl.[7] ............................................. G05D 23/13
(52) U.S. Cl. ............................ 236/12.12; 137/624.11; 137/801; 251/129.04
(58) Field of Search ........................... 236/12.1, 12.11, 236/12.12, 51, 94; 137/337, 624.11, 801; 251/129.04

(56) References Cited

U.S. PATENT DOCUMENTS

| | | | | |
|---|---|---|---|---|
| 4,886,207 A | * | 12/1989 | Lee et al. ................ | 236/12.12 |
| 6,059,192 A | * | 5/2000 | Zosimadis ................ | 236/12.12 |
| RE37,888 E | * | 10/2002 | Cretu-Petra .............. | 236/12.12 |
| 6,513,787 B1 | * | 2/2003 | Jeromson et al. ........ | 251/129.04 |
| 6,688,530 B2 | * | 2/2004 | Wack et al. .............. | 236/12.12 |
| 2004/0041033 A1 | * | 3/2004 | Kemp ...................... | 236/12.12 |

* cited by examiner

Primary Examiner—Marc Norman

(57) ABSTRACT

The present invention provides a means to add electronic control of temperature and flow rate for fluids in standard faucets. The device is self powered by means of the fluid flowing through it and generates sufficient power to operate the control electronics. Elimination of an external power source or internal battery, is important for simple retrofit installations as well as maintenance free operation for many years. The invention consists of two components that communicate with each other via either an RF (radio frequency), IR (infra red) or a wired link. The Mixing Unit serves to mix the incoming hot and cold fluids (typically water but any fluid can be mixed) to a desired temperature under control of the Main Control Unit. The Main Control Unit provides a means by which the user can adjust the temperature as well as automatically turn on and off the fluid flow.

7 Claims, 6 Drawing Sheets

Typical Installations

SELF POWERED ELECTRONICALLY CONTROLLED MIXING VALVE

RELATED U.S. APPLICATIONS

This first non-provisional patent applications makes claim to the Provisional Application for Patent filed Dec. 4, 2002 and titled Self powered electronically controlled mixing valve, of the same inventor ship and with the express mail label no ET848516824 US.

Reference U.S. Patent Documents:
U.S. Pat. No. 5,459,890 Water blending and recycling apparatus
U.S. Pat. No. 5,570,869 Self calibrating water fluid control apparatus
U.S. Pat. No. 5,611,517 Control unit for automatic faucet
U.S. Pat. No. 5,915,417 Automatic fluid control valve apparatus
U.S. Pat. No. 5,988,588 Control module for battery operated faucet
U.S. Pat. No. 6,202,980 Electronic faucet B1
U.S. Pat. No. 6,273,394 Electronic faucet
U.S. Pat. No. 6,290,207 Electronic motorized zone valve
U.S. Pat. No. 6,390,125 Valve system sanitary fixture
U.S. Pat. No. 6,446,875 Water temperature and pressure control system
U.S. Pat. No. 6,460,567 Sealed motor driven valve
U.S. Pat. No. 6,471,132 Electrostatic mixing device with arrangement to increase mixing
U.S. Pat. No. 6,478,285 Electronically operated fitting
ore037888 Water faucet with touchless controls.

Fields of Search:
668; 236; 126/362; 137/337, 624, 801; 224/902; 251/30.04; 251/129; 4/623

The invention is especially suited for retrofit applications where the electronic controls can be added to an existing installed faucet without having to replace or even remove the existing faucet. Of course, it is also suitable for use on new faucets as well as being integrally designed into new faucet designs. Additionally, the invention is intended to be simple enough to install, as a retrofit device, that a typical home owner, with minimal mechanical and electrical capabilities, can perform the upgrade in a short period of time. The cost of the device is also intended to be low enough that it can be sold through retail home improvement stores.

The unit is installed in a retro-fit application by disconnecting the hot water connection between the hot water supply line and the hot water input to the faucet and then disconnecting the cold water connection between the cold water supply line and the cold water input to the faucet. The hot water supply line is connected to the mixing unit's hot water input and the cold water supply line is connected to the mixing unit's cold water input. The mixed output hot water connection is connected to the hot water connection of the faucet and the mixed output cold water connection is connected to the cold water connection of the faucet.

Water flow rate is controlled by the existing faucet control valves by adjusting either the hot or cold water valve on the faucet to provide the desired flow rate or optionally by an integral flow rate solenoid. Temperature is controlled via the Main Control Unit's touch sensitive surface. The user presses the surface of the Main Control Unit along a varying temperature graphic depicting the relative water temperature. The actual water temperature can be displayed on the Main Control Unit as well.

BACKGROUND OF INVENTION

Currently there are no retrofit kits to reconfigure existing faucets with electronic controls. If an electronic faucet is desired, the existing faucet must be replaced with a new electronic faucet that is of an industrial design and that does not match the user's existing fixtures nor match the existing décor. It can be a costly expense especially if the existing fixtures are expensive or perhaps have nonstandard mounting characteristics. Electronic faucets are also not available in "designer" styles like most standard faucets.

Electronic faucets offer the convenience of turning on upon detecting the presence of the user, usually by the user placing their hands in close proximity to the water spout. Additionally, electronic faucets provide water saving benefits by automatically turning off after use, thereby preventing the waste of water should someone forget to turn it off. Typically, electronic faucets are used in industrial implementations such as a public bathrooms. A standard installation with these types of fixtures usually includes a common warm water inlet preset to some mild temperature that feeds all of the electronic faucets. This prevents the user from being able to adjust the water temperature during use.

What is needed is a system that provides all the conveniences of electronic faucets with the niceties of adjustable temperature control during use and that can be added to existing installed faucets, thereby preserving existing faucets and their customizable styles that match the user's décor.

DETAILED DESCRIPTION OF PREFERRED EMBODIMENT

Preferred Embodiment—Electronic Temperature Controlled Water Faucet

Figure 7:
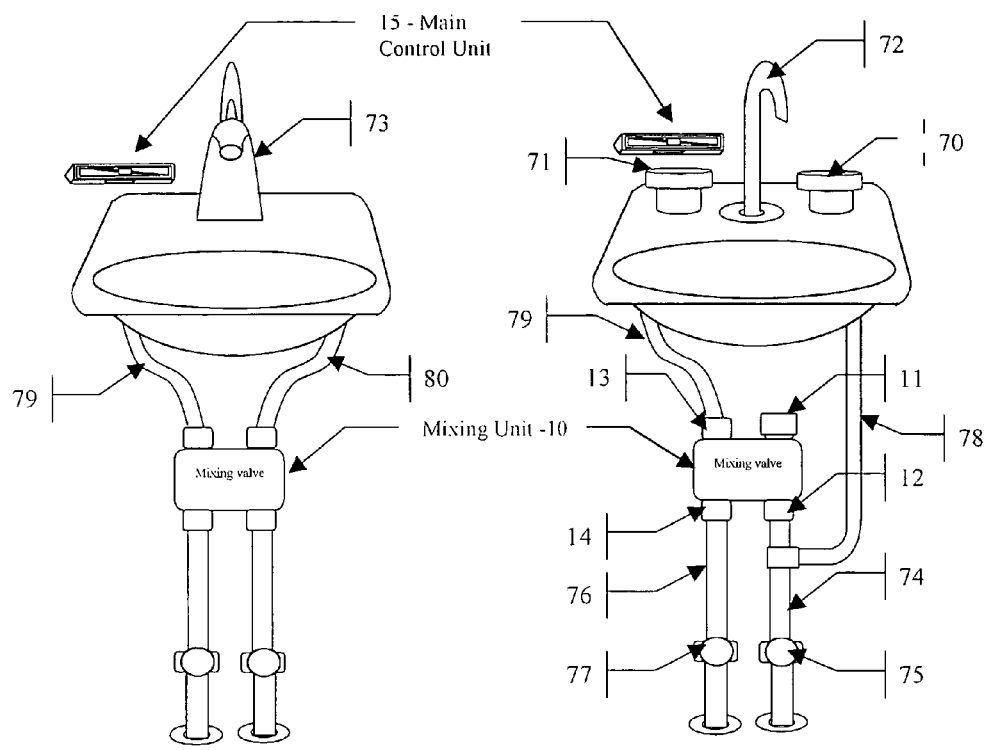
FIG. 7 shows typical installations for single (mixing valve) and dual valve faucets.

In the simplest embodiment of the invention, refer to FIG. 7, operation is accomplished by simply turning on the faucet by opening either the hot or cold faucet valves (handles) - 70 or 71 respectively, or on single control faucets by actuating the one water mixing valve control handle - 73. The water flow rate is controlled by the amount that the user opens up the faucet valve in exactly the same way that the faucet worked prior to the installation of the invention. If either the hot or cold handles - 70, 71, 73 are turned on just a little, then only a slow stream of temperature controlled water flows. If the faucet valve is opened up all the way, then a full stream of temperature controlled water will flow. The temperature of the water is completely controlled by the invention, and not in any way by either of the hot or cold water valves on the faucet as was the case for the faucet prior to installation of the invention. The user will receive the same temperature water by turning on either of the hot or the cold faucet handles 70, 71. Single handle faucets that have mixing valves incorporated into their design - 73 operate in the same fashion as two valve faucets in that only the flow rate of the water is now controlled by the faucet - 73 and the temperature of the water is controlled by the invention regardless of the position of the handle.

Still referring to FIG. 7, the temperature controlled mixed water from mixing unit - 10 is directed to the faucet on both the hot and cold water output connectors - 11 & 13 via supply lines - 79 and 80 respectively. Because of this connection arrangement, it does not matter which faucet control valve, hot or cold, is actuated to turn on the water. Regardless of which valve is turned on, the water of the desired temperature will be delivered to the user.

An alternative installation, shown in FIG. 7, for two dual valve faucets is to run the cold water supply - 74 into the cold water input fitting - 12 of the mixing valve as well as directly into the cold water valve of the faucet - 70 via a separate cold water supply line - 78. The hot water supply is connected directly to the hot water input fitting of the invention - 13 and one of the mixed water outputs - 11 or 13 is connected to the hot water supply of the faucet via supply line - 79. The unused mixed water output - 11 or 13 is capped off and is not used. In this installation, the user can have the cold water valve of the faucet always provide cold water while the hot water valve can provide temperature controlled water.

Figure 1:
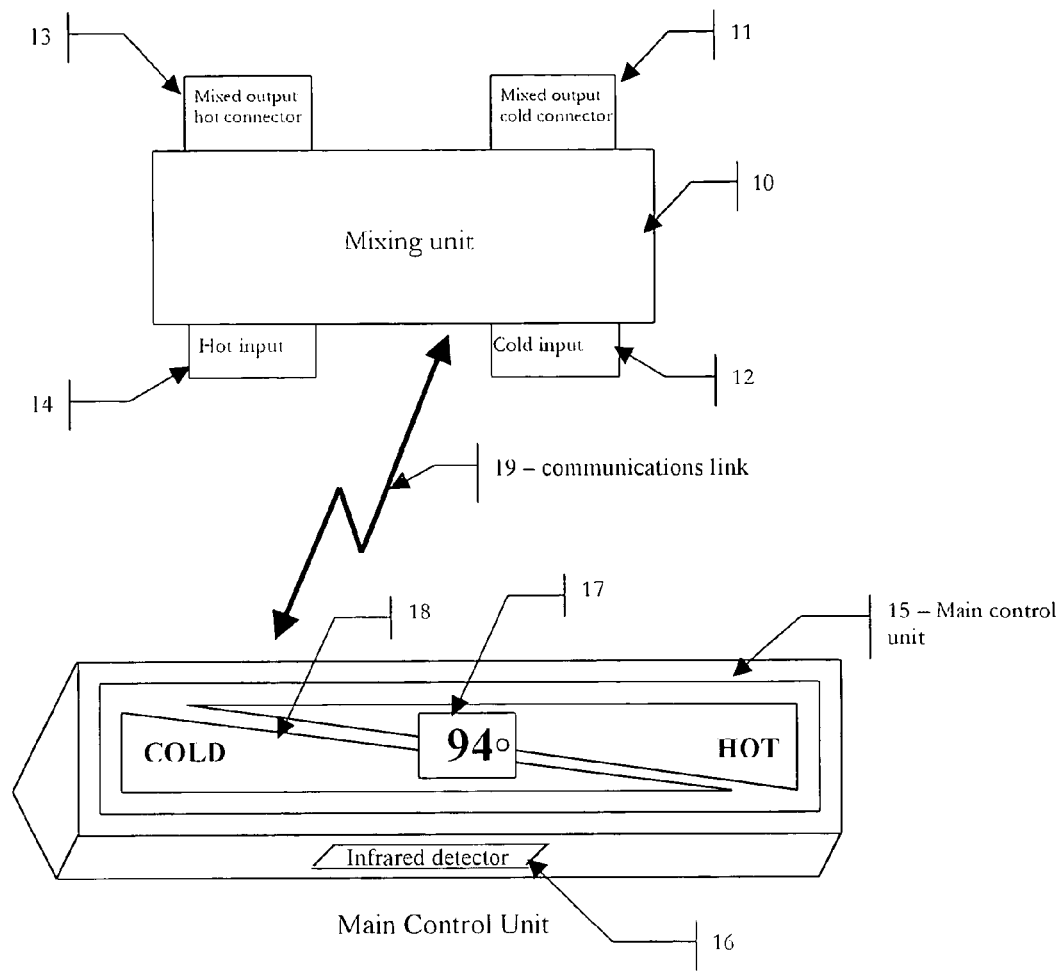
FIG. 1 shows a high level diagram showing the two main components comprising the system—the Mixing Unit and the Main Control Unit.

Referring to FIG. 1 the invention allows the water temperature to be controlled by the user by simply selecting (pressing) the desired touch pad location on main control unit - 15 that represents the relative desired temperature. Pressure sensitive "touch" pad locations are located under the surface decal of the main control unit - 18 approximately every one eighth inch to provide the user with sufficient gradations in temperature control. In actual application, any number of these preset temperature buttons can be provided on the Main Control Unit - 15. Additionally, larger buttons can be added that have specific temperature designators, such as "cold", "84° F.", "max hot", etc for simple adjustment for the most commonly used water temperatures. These temperature selection buttons have default temperature settings but can be customized by the user holding down on a single spot on said surface graphic while the displayed temperature slowly increases, and when the desired temperature is reached, removing the finger. This new temperature is stored in non-volatile memory within the mixing unit - 10. The initial default temperature for each of the temperature buttons is calculated by the microcomputer after installation, and the first time the unit is powered up, by first measuring the cold water supply temperature. This temperature is assigned to the lowest "cold" button on the main control unit display. To prevent scalding, the hot water supply temperature is not measured, instead, it is assumed to be 160 degrees F., the temperature at which the microcomputer limits the maximum temperature of the mixed water. The difference between the 160 degrees F. and the measured cold water source is divided by twenty four (an arbitrary number of touch activated locations on the temperature display), the number of buttons on the main control unit temperature display graphic, and this number becomes the incremental temperature step adjustment for each button. The user can also program the maximum temperature button "hot" to a maximum comfortable or safe temperature by pressing and holding it down as described above. In this case the temperature display will slowly decrease the temperature of the water until the user's finger is removed. The microcomputer will then recalibrate the twenty four selection buttons using this new maximum temperature, as described above.

Immediately upon the water faucet being turned on, a message is sent from the Mixing Unit - 10 to the Main Control Unit - 15 to activate the temperature display on the Main Control Unit - 17 that is associated with the temperature of the water to be delivered. The temperature of the water to be delivered is the temperature setting that was last selected. If the user wants hotter or colder water, then an appropriate temperature selection button is selected. The water temperature can be changed either before or after the water faucet is turned on.

Figure 2:
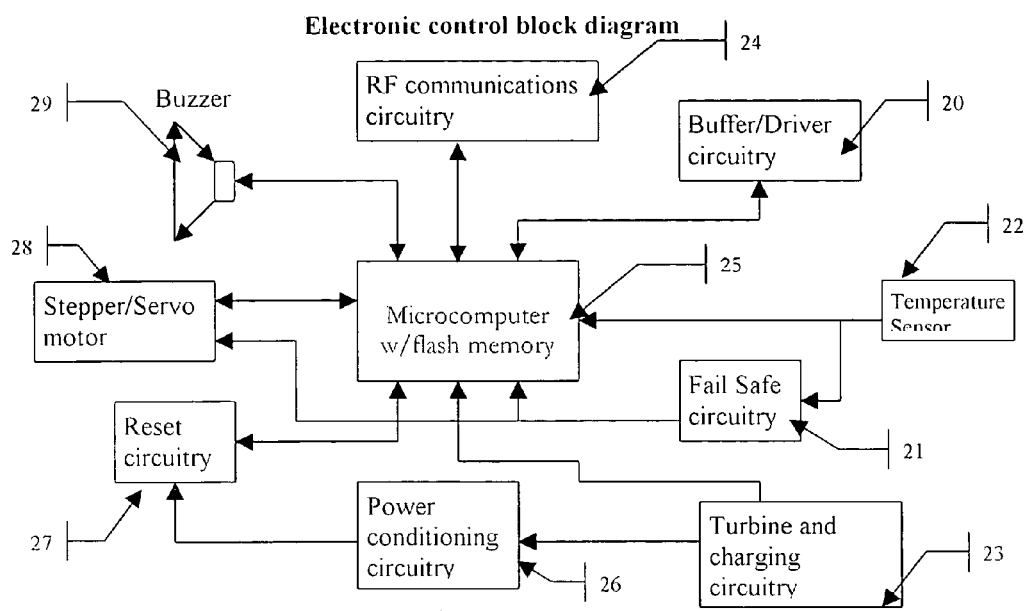
FIG. 2 shows a block diagram of the Electronic Control Assembly.
Figure 4:
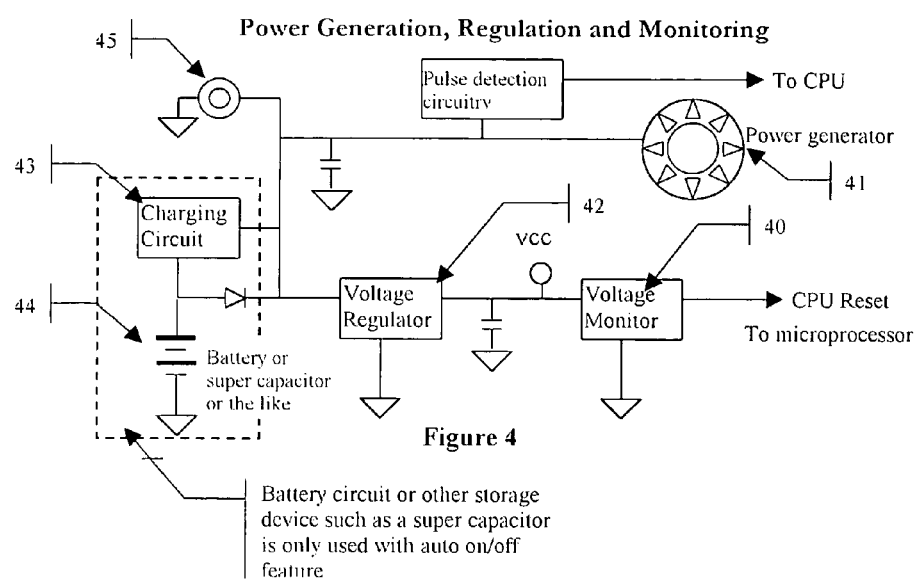
FIG. 4 shows the Power Generation, Regulation and Monitoring Circuitry.
Figure 5:
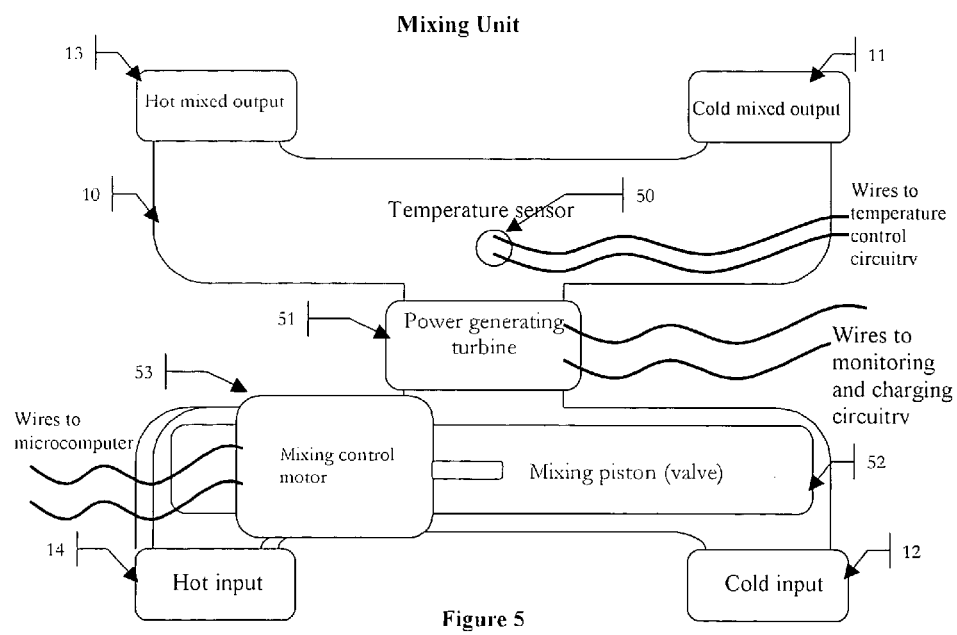
FIG. 5 shows the Mixing Unit without fluid flow control functions.
Figure 6:
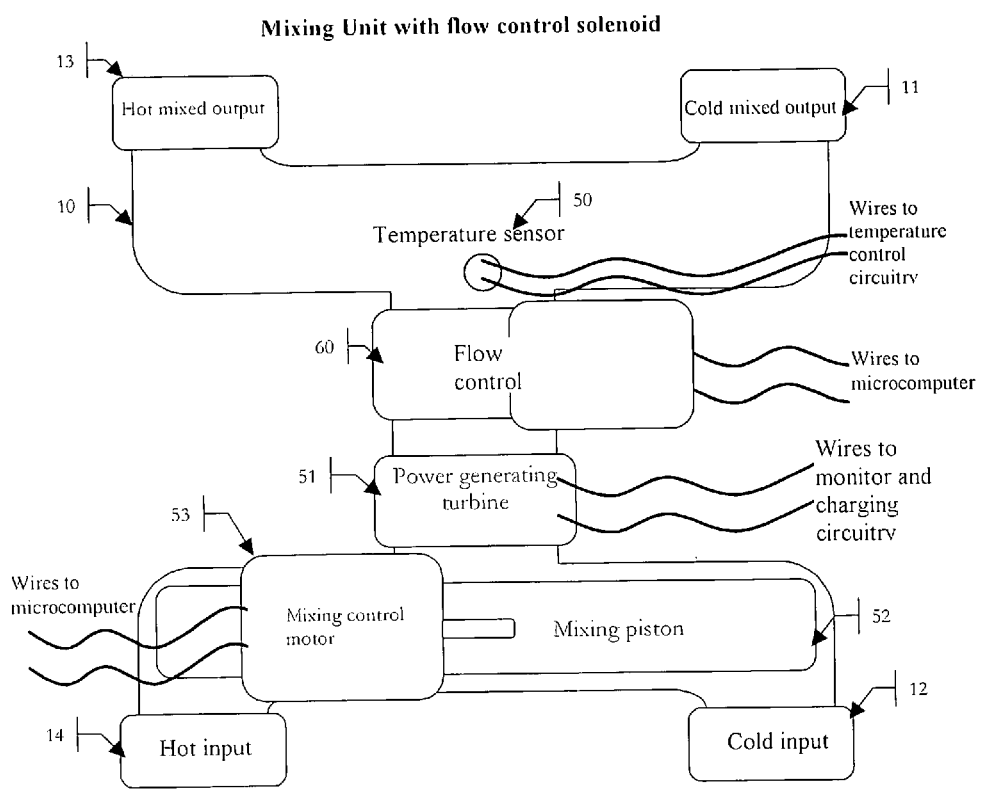
FIG. 6 shows the Mixing Unit with fluid flow control functions.

Referring to FIG. 2, turning on the faucet will cause water to flow through the Mixing Unit - 10 that will in turn spin the turbine generator - FIG. 4, - 41 and the optional charging circuitry - 23 to activate. The generated power is directed to the power conditioning circuitry - 26 that generates the correct voltages that are needed by the control electronics and motors and actuators. Reset circuitry - 27 holds the microcomputer - 25 and all other electronic functions in "reset", deactivated, until the power is stabilized. This process takes about 250 ms. Upon detection of stable power, the reset circuitry - 27 will activate the microcomputer - 25.

Upon activation, the microcomputer - 25 contacts the main control unit via its communications link - 19 (Communications link - 19 is implemented as either a bi-directional or unidirectional RF (radio frequency) link. Alternative implementations include an IR (infrared) or a wired (physical) link.) to retrieve the desired water temperature setting. The microcomputer - 25 will determine, by means of a temperature sensor - 22 and a closed loop control program, if hot or cold water needs to be adjusted to set the output temperature to the desired temperature. The Mixer Unit - 10 will sound a chime to inform the user that the desired temperature has been attained. Alternatively, the Mixing Unit - 10 will send a message to the Main Control Unit - 15 and cause the Main Control Unit - 15 to output a chime to inform the user that the water has reached the desired temperature. In actuality, the chime is delayed a couple seconds after the Mixing Unit - 10 has actually reached the desired temperature to allow the water to reach the spout. For safety reasons and to prevent scalding in case a user places their hands into the water stream before the desired temperature is reached, the microcomputer will always start mixing the water from a cooler temperature and add hot water until the desired temperature is reached. In the case where hot water was used prior to a cooler temperature being selected, the microcomputer will beep several times to inform the user that hot water is flowing form the faucet. When the desired temperature is reached the microcomputer will again beep once to let the user know that the desired temperature has been reached.

The placement of the temperature sensor - 22 is not particularly critical except that it be placed in the mixed output stream where accurate mixed water temperature sensing can be accomplished.

In the situation where the water has not been used for some time, and the incoming hot water supply has cooled, the device will adjust the mixing valve to demand full hot water to flush out the hot water line as quickly as possible. As the incoming hot water warms, the invention will continually adjust the mixing valve to maintain the desired temperature. The invention continuously monitors the mixed water temperature and adjusts the mixing valve as necessary to compensate for temperature or pressure fluctuations in the incoming hot and cold water supplies.

Referring to FIG. 4, a turbine flowmeter - 41 is used to detect water flow as well as to generate the power required to run the electronic control module and associated motors and solenoids, FIGS. 5 & 6 - 51, 53 and 60. When the water flow is controlled by the faucet itself, the action of turning on the water causes the turbine to spin and generate the electrical power needed by the system. Upon power up, the microprocessor will begin to control the water temperature. When the automatic turn on/off feature is incorporated into the product, a charging circuit - 43 and storage device - 44 such as a battery or super capacitor (or any other energy storage device) are added in the design so as to power the flow control solenoid in order to start the water flowing before the turbine generator is spinning. In this instance, the turbine flowmeter generator is also used to charge a rechargeable lithium ion battery.

The veins of the turbine - 41 have high strength permanent magnets built into them and wire wound coils around the outside of its housing. The housing is made of a non-ferrous material (metal or plastic) so as to not interfere with the magnetic flux on the vein magnets. A positive displacement flowmeter can also be used instead of a turbine flowmeter. The actual type of flowmeter is not particularly important as long as the device produces a sufficient amount of power, voltage and current, to run the electronics and to recharge the storage device. A screen and a very strong magnetic plug are installed the incoming water manifold - 10 to filter out debris and to attract any magnetic particles that may be floating in the water prior to the water coming in contact with the magnetic veins of the generator. This prevents debris from clogging the generator.

A power up delay of approximately one quarter of a second is designed into the reset circuitry - 27 to delay the microcomputer turn on until a sufficient charge has been stored in a large capacitor in the power conditioning circuitry - 26 to assure that the microcomputer can shut down properly should the water be turned on for only a very short period of time.

While the flowmeter is not used to measure water volume, and therefore water usage, it can be used for that purpose should some sort of water flow restriction or usage monitoring be desired in a product employing this invention. Additionally, an alternative embodiment wherein the invention is used to mix fluids in specific ratios can be implemented by using a positive displacement flowmeter as the turbine device. Such a device will not only develop the required power for the system but it can be used to measure fluid volume by monitoring the number of revolutions by means of a pulse detection circuit built into the turbine and charging circuitry - 23.

Upon initial power up the microcomputer 25 will query the main control unit - 15 via the communications interface - 19 for the requested water temperature. The main control unit - 15 will respond with the temperature last requested. If no response is received from the main control unit - 15, due to some failure such as a battery failure within the main control unit - 15, the microcomputer will default to a warm water temperature of 85 degrees F., and it will inform the main control unit of the selected temperature. In this circumstance the microcomputer will produce three long beeps.

Water temperature control is performed by means of a closed-loop control function running in the microcomputer - 25. A semiconductor based temperature sensor - 22 is installed into the mixed output water stream manifold. This temperature sensor - 22 gives the microcomputer - 25 instantaneous feedback of the mixed water temperature. The microcomputer - 25 calculates the offset of the actual temperature to the desired temperature and makes a determination as to how much the mixer valve must be adjusted to regulate the water temperature to the desired temperature as quickly as possible. The control algorithm, a PID (proportional Integral Derivative closed loop control algorithm) can accurately adjust the water temperature to the specified temperature even if the incoming hot and cold water sources are incorrectly connected to the device, that is to say that the hot and cold water supplies are connected to the wrong inputs - 12 and - 14 of the mixing unit - 10.

Figure 3:
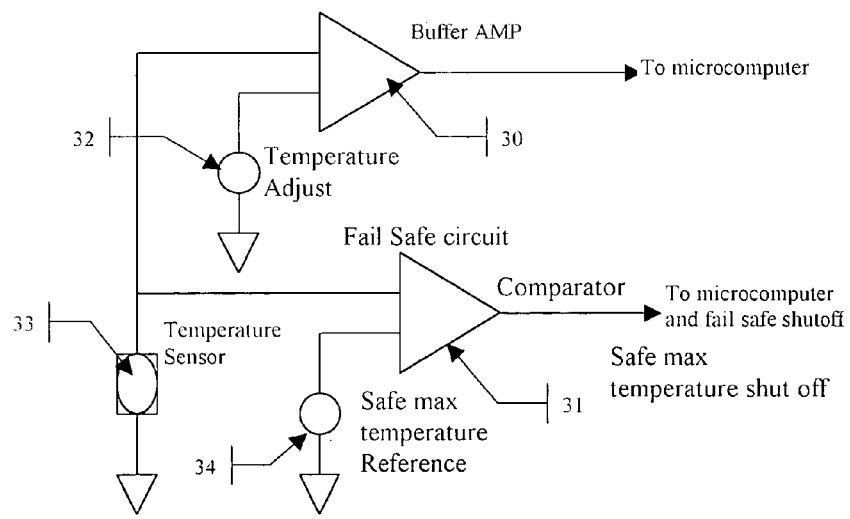
FIG. 3 shows the Temperature Sensor and Fail Safe Circuitry.

Anti-scald protection features are implemented in software via the microcomputer - 25 closed loop control program, hardware via the fail safe circuitry FIG. 3, and mechanically by means of an electrostatic bimetallic element contained within the mixing piston (valve) - 52. The software limits the maximum output temperature to 160 degrees F. Should the microcontroller - 25 malfunction and allow the water temperature to exceed 165 degrees F., the failsafe hardware detection circuitry - FIG. 3, will disengage the stepper/servo motor from the mixing valve causing the mixing valve to self locate the mixing piston to a 50% hot water and 50% cold water mix. An additional mechanical protection device, a thermostatic temperature controller is also designed into the mixing valve - 52 which limits the maximum possible temperature to 175 degrees F. should the microcomputer - 25 and fail safe circuitry - FIG. 3 both fail.

Referring to FIG. 3), the temperature sensor 33 output is connected to both a buffer amplifier - 30 and a comparator circuit - 31. The buffer amplifier - 30 is used to scale the temperature sensor output for full scale reading at the microcomputer - 25 analog to digital converter input. The buffer amplifier temperature adjustment 32 provides the necessary reference gain for a full scale 12 bit A/D reading from 0° C. to about 90° C. The failsafe comparator 31 compares the temperature sensor output to a maximum safe temperature reference that represents about 160° F., the maximum allowable hot water temperatures.

What is claimed is:

1. A self powered electronically controlled mixing valve comprised of:
   a hot fluid source input fitting; a cold fluid source input fitting, two mixed output fittings, a piston style fluid mixing element with an integral thermostatic temperature control element for fail-safe maximum temperature limitations such as in anti-scald protection;
   an electronically operated drive means to control said mixing valve to adjust output temperature;
   an electronic control module coupled to said mixing unit, and enclosed in a protective housing, that includes a microcomputer, a control program stored in said microcomputer, a temperature sensor for measuring mixed fluid output temperature, a drive motor for the means to control said fluid mixing element, power generating capability, sound generation capability and RF, IR or wired communications capabilities to communicate with a main control unit;
   an electromechanical power generating device positioned in the fluid flow of said mixing unit and driven by the fluid moving through said device so as to produce sufficient voltage and current to power the electronic control module;
   an electronic control module that develops it own operating power by means of flowing fluid that eliminates the need for a battery and the problems associated with battery failures and battery replacement;

a mixing valve assembly specifically optimized for retrofit installations wherein any existing faucet can be adapted to an electronically temperature controlled faucet without removal or replacement and specifically wherein said existing faucet controls the water flow and flow rate by means of existing faucet controls or handles;

said microcomputer being operable under control of said program to operate fluid mixing element based upon changes in output mixed temperature to control the temperature of the mixed fluid output;

said microcomputer being operable under control of said program to operate fluid mixing element based upon changes in output mixed temperature to control the temperature of the mixed fluid output when the incoming hot and cold fluid sources may be misconnected, i.e. swapped, when the system is installed;

said microcomputer being operable under control of said program to operate fluid mixing element based upon changes in output mixed temperature to control the temperature of the mixed fluid output when the incoming hot and cold fluid sources pressure and/or temperature fluctuate due to external environmental effects or by usage of other fluid fixtures such as flushing toilets or turning on other faucets as in the case of a water faucet application;

said microcomputer being operable under control of said program to generate audible tones to signal the user that the desired temperature has been attained;

a main control unit that contains a microcomputer that communicates with mixing valve electronic control module via a uni-directional or a bi-directional RF, IR or wired signaling scheme, and said main control unit sends and receives temperature information to and from electronic control module of mixing valve unit and displays temperature and allows user to change temperature at any time;

an electronic main control unit that can be located anywhere near or far from the output fluid source and that can be powered by either AC mains power or a battery source, and that provides a means to change batteries, and of water proof design so as to prevent damage from controlled fluids;

an electronic main control unit with touch sensitive surface that allows the user to control the mixed output fluid temperature by pressing on the surface of the Main Control Unit along a varying temperature graphic depicting the relative fluid temperature and that displays the actual fluid temperature on its surface, such touch sensitive areas are located under the surface decal of the main control unit (2) approximately every one eighth inch to provide the user with sufficient gradations in temperature control, additionally, main control unit microcomputer provides for Finer temperature adjustment by holding down on a single spot on said surface graphic while the displayed temperature slowly increases, and when the desired temperature is reached, removing the finger;

an electronic main control unit with an infrared sensor device to detect the presence of an object such as a lever or another mechanical device or a user's hands to automatically turn on the fluid flow by means of sending control information over said RF, IR or wired communication link to the electronic control module of the mixing unit which in turn controls a solenoid device to start the fluid flow.

2. A self powered electronically controlled mixing valve of claim 1 with a single flow control solenoid placed in line with power generator turbine, either before of after, and actuated by electronic control module to turn fluid flow on and off under command from main control unit that incorporates an infrared detection device to automatically turn on and off fluid flow upon detection of some physical obstruction such as a mechanical device or a user's hands placed in close proximity of main control unit;

a solenoid device of such a design that allows varying amounts of fluid flow through the system by controlling the amount that the solenoid device opens and that is under control of the electronic control module and main control unit;

a timeout to shut off the fluid automatically after a predefined period of time has elapsed from the time that the device is activated, or after a predefined period of time after the initiating action that caused the device to activate has been removed, such as after the user removes their hands from the proximity, of a sink or the removal of some other mechanical activation element.

3. A self powered electronic control module of the type of claim 1 that can be adapted to operate existing fluid mixing valve designs from various manufacturers, with appropriate mechanical adaptation for proper operation of such existing faucets and other devices as shower faucets that have a single mixed water output fitting, so as to be useful as an integral upgrade for existing mixing valve designs for said various manufacturers to offer electronic functionality to their respective product lines.

4. A self powered electronically controlled mixing valve of claim 1 that mixes fluids of varying viscosity to produce a mixed output of a desired viscosity; such an application is implemented utilizing the full displacement type turbine and monitoring turbine rotational speed with said microcomputer; and a calculation is made by said microprocessor to determine corrections to mixing valve position; with viscosity mixing can be performed in conjunction with said temperature sensor; said desired viscosity being controlled by the main control unit with user graduations defined in volume/seconds units such as cubic centimeters per second instead of a temperature scale.

5. A self powered electronically controlled mixing valve of claim 1 that mixes fluids based upon a specified ratio; said ratio being controlled by the main control unit with user graduations defined in percentages instead of temperature or viscosity.

6. A self powered electronically controlled mixing valve of claim 1 with a voice recognition feature added to either the mixing unit or the main control unit that allows user to set the desired temperature verbally.

7. A self powered electronically controlled mixing valve of claim 1 incorporating a stepper motor, servo motor or any other suitable electronically controlled device to operate and control the fluid mixing element.

* * * * *